United States Patent Office 3,397,549
Patented Aug. 20, 1968

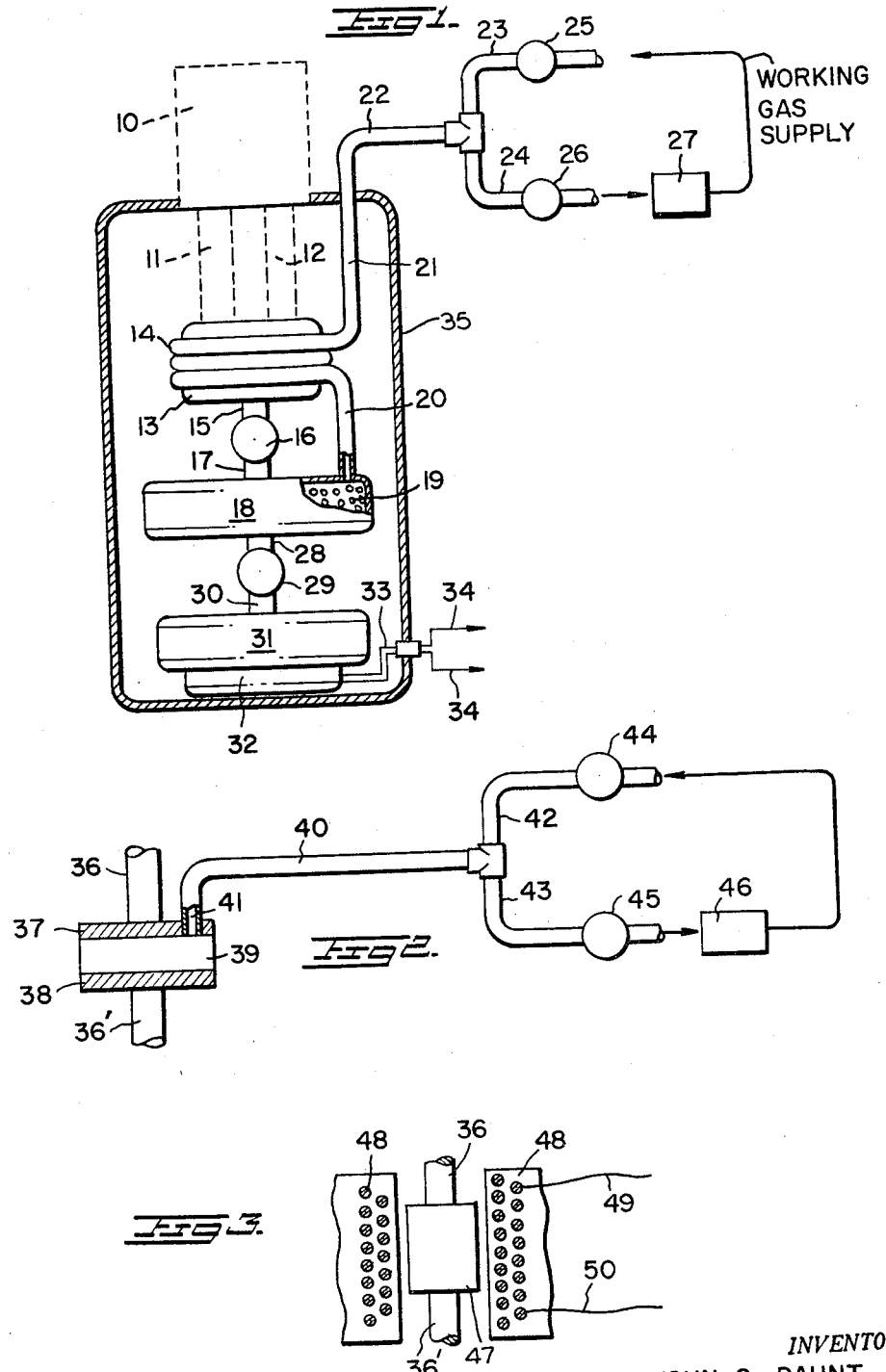

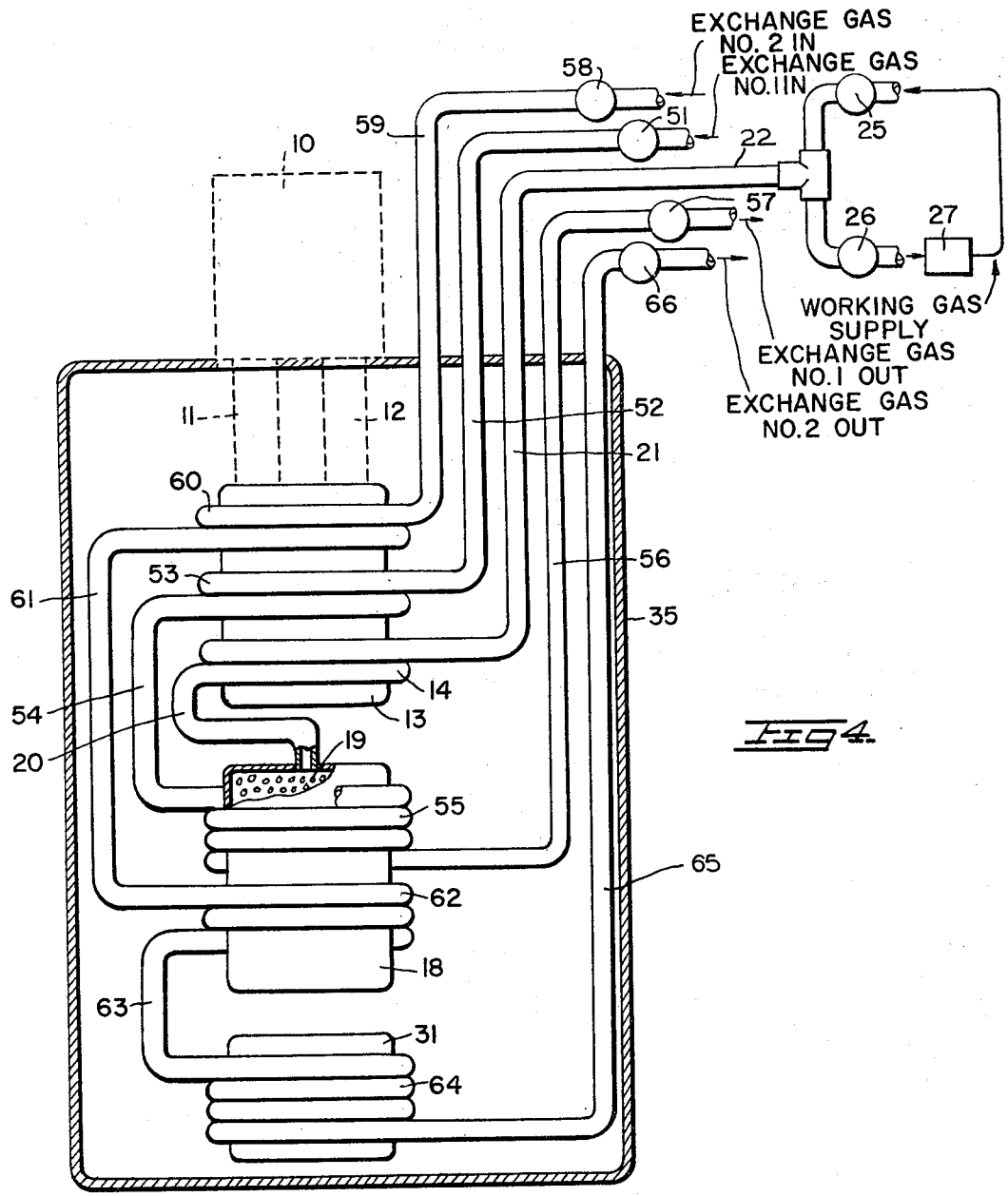

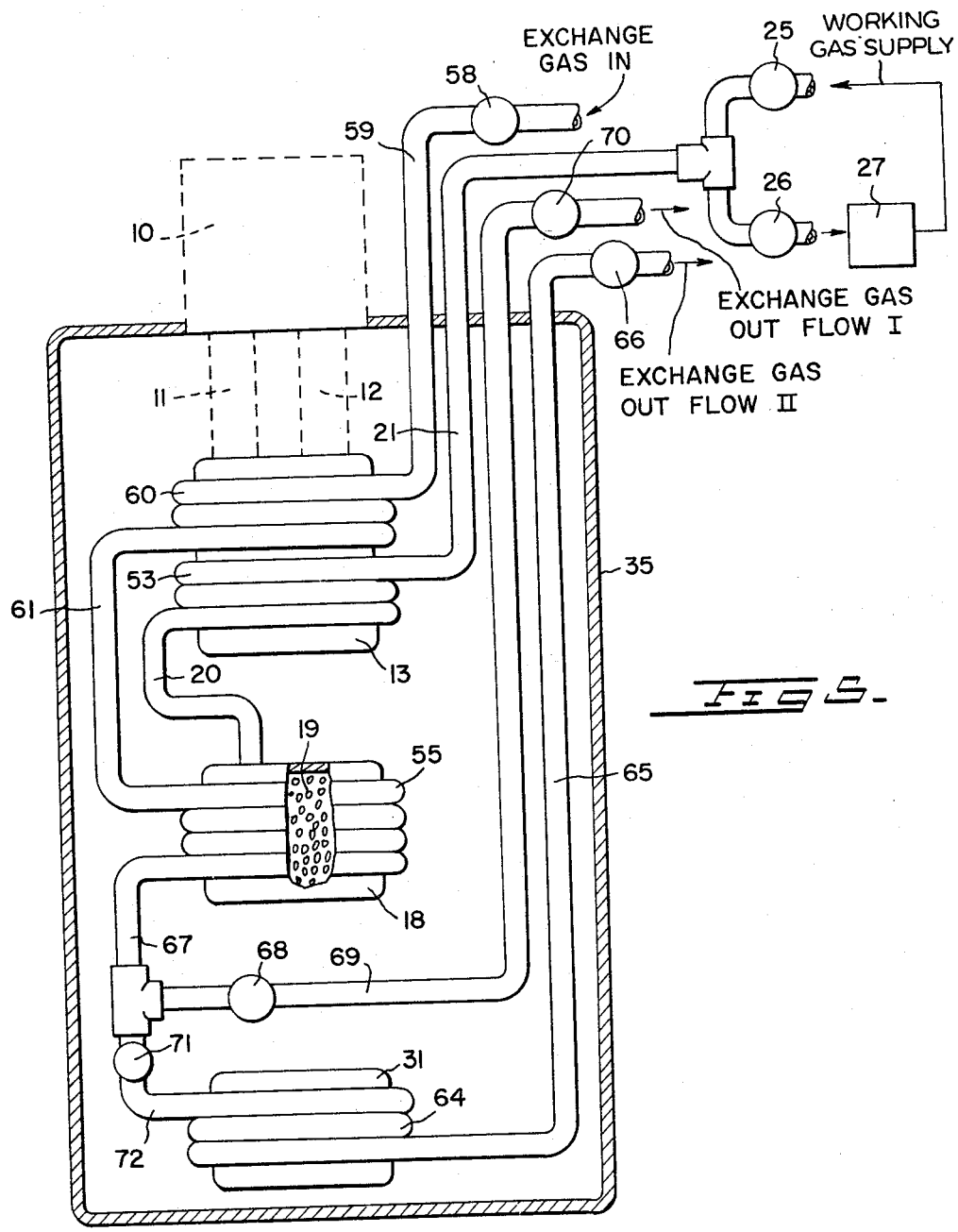

3,397,549
CYCLIC DESORPTION REFRIGERATOR
John G. Daunt, New York, N.Y., assignor to Research Corporation, New York, N.Y., a non-profit corporation of New York
Filed May 29, 1967, Ser. No. 642,025
14 Claims. (Cl. 62—79)

ABSTRACT OF THE DISCLOSURE

Refrigeration at cryogenic temperatures is effected by cyclically adsorbing a gas, such as helium, on an adsorbent in a thermally isolatable chamber while maintaining heat transfer between the chamber and a heat sink; desorbing the gas while maintaining the chamber in substantial thermal isolation until the temperature in the chamber is substantially below the temperature of the heat sink, continuing to desorb the gas while maintaining heat transfer between the chamber and an object to be refrigerated, and supplying gas to the chamber while maintaining the chamber in substantial thermal isolation until the temperature in the chamber is approximately that of the heat sink. Heat transfer and thermal isolation in the successive stages of the cycle is effected by means of thermal valves or by valved gas conduits.

Specification

This invention relates to methods and apparatus for refrigeration and more particularly to a method and apparatus utilizing cyclic desorption cooling for producing cryogenic temperatures.

Currently there are many applications, for example, in the fields of electronics and space technology, for refrigerators, operating in a continuous or cyclic manner, which produce and maintain heat sinks at temperatures down to a few degrees absolute. In recent years there has been an active interest in furthering the state of the art of refrigeration, especially in miniature systems. One such miniature cryogenic engine is described in U.S. Patent No. 3,074,244 to Stephen F. Malaker and John G. Daunt.

Prior art in refrigeration at very low cryogenic temperatures is based essentially on the cooling produced by adiabatic or quasi-adiabatic expansion of a gas and/or the cooling produced in the Joule-Thomson expansion of a gas. Efficient and reliable refrigeration systems, such as that cited above, have been made using the Stirling or the Taconis cycles or a combination of both. These systems basically produce refrigeration through gas expansion. Using such engines, or using, for example, engines based on the Brayton cycle, either singly or in cascade, it has been found that there is a lower limit to the temperature attainable, which is determined by the rapid fall in regenerator or heat exchanger efficiencies or by the deterioration of the thermodynamic efficiency of the expanders or both. This lower limit is in the range 10° K. to 15° K. In order to reach temperatures below this limit in continuously operating or cyclic refrigerators, it has been proposed to introduce a final Joule-Thomson cooling cycle, using helium as the working fluid, thus hybridizing the system. The said Joule-Thomson cooling cycle would use as its initial starting temperature the lowest temperature reached by the main refrigerator and would maintain its final temperature in the range corresponding, in general, to that of liquid helium. Such prior art, initiated by Kapitza in 1933, is still the basis for currently devised systems operating continuously to temperatures below 10° K., as is exemplified by that of Stephen F. Malaker and John G. Daunt (U.S. Patent No. 3,128,605) and by that of Richard L. Garwin (U.S. Patent No. 3,221,- 509). Such hybridization of the overall refrigerator complex is disadvantageous from many points of view. The desired goals for all refrigerators are primarily high efficiency, simplicity of design and construction, long mean life between failures and, for aerial and space operation, low weight. The said introduction of a final stage of Joule-Thomson cooling not only mitigates against these desired goals but also introduces further disadvantages arising from the constriction in the gas flow, in the Joule-Thomson expansion valve, which is prone to blockage with contaminants and from the need for significant gas flow through the Joule-Thomson circuit at pressures in the range 10 to 30 atmospheres, a disadvantageous feature which will be quantitatively discussed in detail below. There is a need therefore for a new method of at least bridging the temperature gap from between 10° K. and 20° K. to temperatures of a few degrees absolute by a refrigeration system which does not suffer from the disadvantages of the Joule-Thomson cooling system.

It is therefore an object of this invention to provide a refrigeration method and system which is new and superior to prior art, which combines simplicity with light weight and which requires no parts needing high precision machinery or fitting.

Another object of this invention is to provide a refrigeration method and system which leads to very long mean operational life between failures by obviating all moving parts at temperatures below ambient and by obviating all constrictions which could cause malfunction due to blockage.

Another object of this invention is to provide a refrigeration method and system which is highly efficient, for example, capable of handling the same refrigeration loads as Joule-Thomson or other present systems yet using smaller gas flows. Yet another object of this invention is to provide a refrigeration method and system which is capable of being cascaded, so that the lowest temperature produced by one system is used as the heat sink for a second system reaching to still lower temperatures and so on, as desired.

A further object of this invention is to provide a refrigeration method and system which is especially adaptable to space operation, as will be discussed further.

In reviewing the prior art on desorption cooling, it has been noted that, in 1926, F. Simon (Physikalische Zeitg. 27, 790) described a "one-shot" method of desorption cooling, which was first realized in an experiment in 1931 by K. Mendelssohn (Zeitschrift fur Physik. 73, 482). Basically, the method made use of the negative heat of desorption of helium gas, previously adsorbed at a low temperature onto an adsorbent, such as charcoal, to cool the charcoal, and hence the container. The experiment was of theoretical interest only, since it did not provide cyclic or continuous cooling.

An important feature of the present invention is the use of refrigerative means whereby cyclic desorption cooling is performed, so that a heat station or load may be maintained continuously at cryogenic temperatures. Other important features include the cyclic process of alternately adsorbing a working gas on an adsorbent at an upper temperature, and desorbing said gas at a lower temperature, thus transferring heat from the lower temperature, to the upper temperature, where it is rejected into a heat sink. There is no restriction on the absolute value of the upper temperature of operation of the cyclic desorption refrigerative system, since its method of operation is independent of the absolute value of the sink temperature. Since, in general, the lower temperature reached is approximately one-half of the upper temperature, the choice of upper sink temperature will be determined by the desired lower temperature for refrigeration. Another advantageous feature is that this invention makes use of the large heats of desorption of gases on active adsorbents at low temperatures which results in refrigeration at high efficiency.

This invention further features the use of thermal valves or gas streams to convey the heat of adsorption of the working gas on the active adsorbent, when it is at the upper temperature, from the adsorbent to the heat sink. This use of thermal valves or gas streams advantageously conveys the heat generated by the refrigerated load in the heat station at the lower temperature to the active adsorbent during that part of the cycle when the working gas is being desorbed from the adsorbent.

It is to be noted that the present invention is operable at very low pressures of the working gas, and satisfactory performance can be obtained with high efficiency, even if the adsorption is carried out at pressures as low as about one atmosphere, and if the desorption is performed down to pressure of a few centimeters of mercury, or less. Such operation imposes minimal requirements on the circulation pump for the working gas. Moreover, when the cyclic desorption refrigerative system is applied to "space" operation, it can be run from a low pressure supply of working gas and a vacuum pump can be dispensed with, the ambient "space" serving as a pump. In this way, the system is greatly simplified and its reliability is further increased.

A further advantage of the present system is that the lower temperature produced at the refrigerative load is a function of the pressure down to which the desorption part of the cycle is carried, and hence refrigeration temperatures can be readily controlled by control of pressure only. The present invention may be readily adapted to a parallel arrangement of two or more cyclic desorption systems, so that, by includnig a heat exchanging means between any two streams of working gas in any two parallel units, said streams being arranged to flow in opposite directions, an additional increase in efficiency and stability of operation are effected. Also, any one cyclic desorption refrigeration system, or system of two or more in parallel, can be arranged to operate in cascade with one or more other similar systems to reach lower temperatures.

The invention will be more fully described with reference to the accompanying drawings in which presently preferred embodiments are described, and in which the same numerals refer to similar parts of the various figures. In the drawings:

FIG. 1 depicts a simplified diagrammatic representation, in elevational view, and partly in cross-section, of a single stage cyclic desorption refrigeration system embodying the principles of the invention;

FIG. 2 is a diagrammatic partially cross-sectional view of an illustrative form of a thermal valve usable in the refrigeration system of FIG. 1;

FIG. 3 is a diagrammatically, partially cross-sectional view of another form of thermal valve usable in the refrigeration system of FIG. 1;

FIG. 4 is a diagrammatic representation of a single stage cyclic desorption refrigeration system in which the thermal valves of the system of FIG. 1 are replaced by pulsed flows of two circuits of heat exchange gas through appropriate heat exchangers in accordance with the invention; and FIG. 5 is a similar diagrammatic elevational view of a single stage cyclic desorption refrigeration system of the invention, wherein the thermal valves are replaced by pulsed flows in one valved circuit of exchange gas through appropriate heat exchangers.

Referring to the drawings, and particularly to FIG. 1, 10 represents generally a conventional refrigeration or heat-engine unit, such as a miniature Stirling cycle cryogenic engine shown in U.S. Patent 3,074,244, having piston cylinders 11 and 12, the ends of which maintain a low temperature platform or heat sink 13, at for example, a temperature of 20° K. or below.

It is, of course, to be understood that the present invention imposes no restriction on the type of means or manner in which heat sink 13 is maintained, nor the size or scale of the means for maintaining said sink at the desired temperature, since these features are determined by conditions which are not particularly relevant to the present invention such as the total amount of cooling desired at the final lowest temperature, the availability of various cooling means for establishing the heat sink 13 at its desired temperature, and the like. It may, for example, be necessary or convenient, in some applications, to maintain heat sink 13 at the desired temperature by use of refrigerant cryogenic liquids or solids, rather than by use of a refrigeration engine. Heat sink 13 may consist of a solid block of copper, or similar material. Thus the particular means shown in FIG. 1 for maintaining heat sink 13 at its desired temperature is not to be construed as limiting the generality of the method of operation of the cyclic desorption refrigeration system of the present invention, which employs the heat sink 13 merely as its initial heat station.

Attached in thermally conducting relation to heat sink 13 is thermal conduit 15, which, for example, may consist of a rod of metal, such as copper, of high thermal conductance, serving as a means of conducting heat between heat sink 13 and a thermal valve 16. Various types of thermal valves, as exemplified in FIGS. 2 and 3, are described in detail below. Basically, the thermal valve is a means whereby heat may be permitted to flow, or prevented from flowing, in a controlled manner, from one conductor to another. The other side of thermal valve 16 is connected to thermal conduit 17, which may be similar to conduit 15. The conduit 17 serves to conduct heat easily and conveniently to or from conduit 15, when valve 16 is "open," and to or from refrigeration chamber 18.

Refrigerator chamber 18 is an enclosure constructed of material of high thermal conductivity (e.g., of a metal such as copper), and containing an adsorbent 19, which may be activated charcoal, in the form of small grains, or silica gel, or a zeolite, or other adsorbent specifically active in adsorbing the working gas. Connected with chamber 18 is tube 20, made of material of poor thermal conductivity, such as stainless steel, phenol-formaldehyde resin, or the like, which serves as a filling or evacuation means for the working gas to be adsorbed onto or desorbed out of the adsorbent 19. Tube 20 leads to a heat exchange means 14, which may consist of a heat-conductive coil wrapped tightly around or otherwise thermally bonded to heat sink 13, so that an exchange of heat can be effected between the working gas passing into or out of tube 20 and heat sink station 13.

Heat exchanger 14 is likewise connected to tube 21, which is also made of material of poor thermal conductivity and has an extension 22 outside of the refrigerator, having two branches 23 and 24, that are provided with conventional shut-off valves 25 and 26, respectively. The latter are at ambient temperature and serve to permit the introduction of the working gas (such as helium, for example) from its supply (not shown) into chamber 18, or to allow its subsequent evacuation by means of a conventional pump, indicated generally as 27, connected to valved line 24.

There is also attached to the chamber 18, in thermally conducting relation, a second thermal conduit 28, which may be similar to the previously-mentioned thermal conduits, which likewise leads to a second thermal valve 29. Joinable to the other side of valve 29, in thermally conducting relation, is another thermal conduit 30. The other end of conduit 30 is in thermal conducting connection to the final heat station or load 31, which is the object to be maintained at the desired final lowest temperature by the action of the entire cyclic desorption refrigeration system of the invention. Load 31 can be a mass of conductive material, such as copper, if desired, and it may be connectable, in thermal coducting relation, to a superconducting magnet 32, for example, although the load 31 itself may be the magnet. Leads 33 and 34 are electrical connections for the magnet.

All cold parts of the refrigeration system, as illustrated in FIG. 1, are desirably surrounded and thermally insulated by insulating means 35, which may be a vacuum jacket, or other thermally-insulating arrangement.

The following four steps are followed cyclically in order in the operation of the cyclic desorption refrigerating system depicted in FIG. 1:

(a) Quasi-isothermal adsorption

The working gas which, for example, may be helium, and which must be a gas which will not liquefy or solidify at the temperatures and pressures to which it is subjected in the unit, is permitted to enter through valve 25 and lines 23 and 21, whereupon it passes in heat exchange relation (in exchanger 14) with heat sink 13, acquiring thereby approximately the temperature of said heat station. Thereafter, the working gas passes through tube 20, and enters refrigeration chamber 18. During this step, thermal valve 16 is maintained in "open" condition (i.e., it permits heat to pass therethrough), whereas thermal valve 29 is maintained in "closed" condition.

On passing into chamber 18, the working gas is adsorbed onto adsorbent 19 contained therein, and heat of adsorption is liberated. This heat is conducted to the walls of chamber 18, then through thermal conduit 17, through thermal valve 16, through thermal conduit 15, and into heat sink station 13. During the liberation of the heat of adsorption, therefore, the adsorbent 19 remains at approximately the same temperature as heat sink station 13. Thus, the latter step may be referred to as a quasi-isothermal adsorption of the working gas. When the required amount of working gas has been absorbed, the step is terminated by closing valve 25.

(b) Quasi-adiabatic desorption

The next step involves the thermal isolation of chamber 18 by closing thermal valve 16 while thermal valve 29 remains closed, as it was in step (a). The quasi-adiabatic desorption of the working gas is initiated by opening valve 26, thus connecting chamber 18, via tube 20, heat exchange 14, and tube 21, to the external pump 27. By this means the working gas is pumped out of chamber 18 and desorbed from adsorbent 19, which process is accompanied by an absorption of heat. Since, in this step, chamber 18 together with adsorbent 19 are thermally isolated from the surroundings, the adsorption of heat results in a cooling of the chamber and adsorbent. This cooling process is continued by pumping working gas out of the chamber until the chamber has acquired a temperature approximately equal to or somewhat below that at which it is desired to maintain the final heat station or load 31. When this is reached, this step is terminated by opening thermal valve 29.

(c) Quasi-isothermal desorption

The next step (quasi-isothermal desorption) consists of continued pumping of the working gas out of chamber 18 to continue heat absorption by adsorbent 19 while chamber 18 is connected thermally to heat station or load 31 via thermal conduit 28, "open" thermal valve 29, and thermal conduit 30. The absorption of heat by adsorbent 19, therefore, permits a heat load to be injected at heat station 31, thus performing useful refrigeration at the desired low temperature. This, therefore, involves quasi-isothermal desorption, and it is continued until all or nearly all of the working gas has been desorbed from adsorbent 19, or until the pressure of the working gas in chamber 18 has reached a predetermined conveniently low pressure. This step is terminated by closing valve 26 while thermal valve 29 is also "closed."

(d) Quasi-adiabatic adsorption

The final step involving quasi-adiabatic adsorption is initiated by opening valve 25 and permitting the working gas to enter again the chamber 18, via tube 21, heat exchanger 14 and tube 20, while thermal valves 16 and 29 remain "closed." During this step, the adsorption of the working gas onto adsorbent 19 releases heat which raises the temperature of the adsorbent and chamber 18. When this latter temperature has reached a value of approximately equal to or a little over that of heat sink 13, this step is terminated by "opening" thermal valve 16. In so doing, the previously-described step (a) is initiated, and a complete cycle of operations has been effected.

The thermal valves, mentioned heretofore, and incorporated into the embodiment of the present invention shown in FIG. 1 are well-known in the art. Broadly, they include (1) mechanical thermal valves which are dependent upon a make-and-break mechanical contact between two thermally-conducting members, at least one of which is movable, such as those described by Collins and Zimmerman in Physical Review, 90, 991, 1953; (2) thermal valves dependent upon the magneto-thermal resistive effect, such as those described by Mendelssohn and Rosenberg in Proceedings of the Royal Society, London, A 218, 190, 1953, which, for example, employ cadmium single crystals as the valve material; (3) superconducting thermal valves employed at low temperatures, and described by Heer and Daunt in Physical Review, 76, 985, 1959; (4) thermal valves dependent upon the presence or absence of exchange gas between the thermal members; and (5) thermal valves dependent upon the condensation of a gas.

FIG. 2 illustrates a thermal valve of type (4) described above. Here highly thermally conducting (e.g., copper) rods 36 and 36', disposed in vertical alignment, terminate, in heat conducting relation, on spaced plates 37 and 38, respectively. Plates 37 and 38 are held apart by walls 39 which, with the plates, produce a tubular enclosure. Walls 39 are made of a material having poor thermal conductivity, e.g., a phenol formaldehyde resin. One of the plates e.g., plate 37, has opening 41 to which is connected a tube 40 of low thermal conductivity. Tube 40 is connected by a T to tubes 42 and 43 which are provided with shut-off valves 44 and 45, respectively, and which are disposed outside of the refrigerator. Through one of the valves, say valve 44, is supplied a volume of heat exchange gas (e.g., helium) at low pressure, and the gas may be evacuated from the system through, say valve 45, by vacuum pump 46. To effect thermal contact between plates 37 and 38, and thus between thermal conduits 36 and 36', the exchange gas is fed into the space between plates 37 and 38, so that heat is conducted through the exchange gas from one plate to the other. To insulate or thermally isolate thermal conductors 75 and 36 from each other, the valve is "closed" by pumping out the gas by means of pump 46.

FIG. 3 depicts a thermal valve which embodies the (2) and (3) types mentioned previously. Thermal conductors 36 and 36' are connected together by a mass of material 47, such as single crystal cadmium. Around material 47 is mounted an electromagnet 48 having electrical leads 49 and 50. Although cadmium single crystal is disclosed as an example of working material 47, other material may be used which, at cryogenic temperatures, exhibits great differences in thermal conductivity when subjected to a magnetic field. For example, in the unit depicted in FIG. 3, the magneto-thermoresistive material 47 will show a small thermal resistance when the current is turned off from leads 49–50 of solenoid 48, a situation corresponding to having the thermal valve "open." On the other hand, when current is passed through leads 49–50, and an intense magnetic field is produced by solenoid 48, then material 47 shows a high thermal resistance, corresponding to the thermal valve being in "closed" condition.

The system depicted in FIG. 3 is equally applicable to be used for thermal valves in the (3) category. In such case, working material 47 is a suitably chosen superconducting material, such as pure lead or niobium. In zero magnetic field, this superconductor is a poor thermal conductor, so that the thermal valve would be in "closed" position. When a magnetic field, provided by solenoid 48, is applied in strength exceeding the superconducting threshold field, then superconductor 47 becomes relatively highly thermally conducting, thus placing the thermal valve in "open" position.

It is to be noted that heats of desorption in the system of the invention are quite large. For example, at 4° K., desorption of approximately 0.5 s.c.f./m. of helium gas at one atmosphere pressure, or below, would handle a refrigeration load of 1 watt. This can be contrasted with a Joule-Thomson cooling system at 4.2° K. which, even with a liquefaction coefficient as high as 30%, would require approximately 2 s.c.f./m. of helium gas flow for the same refrigerative load of 1 watt.

Although a single stage unit, of the type depicted in FIG. 1, would operate satisfactorily, it is more efficient and convenient to operate the system with two such units in parallel, both operating between the same temperatures provided by the same heat sink 13 and the same heat station or load 31. Such a system, which may be designated a dual single stage system, is operated in such a manner that two separate flows of working gas are at all times disposed in opposite directions in the two units. This means that cycle steps (d) and (a), mentioned above, are taking place in one unit when steps (b) and (c), respectively, are occurring in the other unit, and vice versa. With such a dual single stage system, it is advantageous to couple thermally the two opposing flows by means of counterflow heat exchangers and, in this way, the thermodynamic efficiency is increased.

As already mentioned, the present invention, whether in the form of single unit or dual single stage systems, lends itself readily to cascading, i.e., in a manner such that the heat station or load of one stage is made to serve as the primary heat sink of a second stage, which latter may be either single unit or dual. Such cascading can be extended, if desired, to multiple stages, each succeeding stage reaching a lower temperature than the preceding one.

A further embodiment of the invention is illustrated in FIG. 4. Here two gas streams are employed and they are appropriately ducted and periodically and cyclically pulsed in order to carry out the functions of the thermal valves of FIG. 1. One gas stream serves to carry away the heat of adsorption from the adsorbent 19 when the working gas is introduced in to the refrigeration chamber 18 during the quasi-isothermal adsorption step (a), and the other gas stream serves to carry refrigeration from chamber 18 to the heat station or load 31 during the period when the working gas is being quasi-isothermally desorbed at the lowest temperature from the adsorbent in step (c).

The four steps in the cycle of operation are as follows:

(a) *Quasi-isothermal adsorption*

In this step, the working gas flows from the supply (not shown) through valve 25, tube 21, heat exchanger 14, tube 20, and into refrigeration chamber 18 in which it is adsorbed onto adsorbent 19, while valve 26 is closed. At the same time, a flow of exchange gas No. 1 (such as helium), is introduced through valve 51 and passes through tube 52 and heat exchanger 53, in which latter it acquires the temperature of heat sink 13. Thereafter this gas flows through tube 54 and through heat exchanger 55, in which it takes up the heat of adsorption generated in chamber 18. From there, it flows out via tube 56 and valve 57. During this step no gas flows through the pneumatic circuit of exchange gas No. 2. To terminate this step, the flow of working gas is stopped by closing valve 25, and the flow of exchange gas No. 1 is stopped by closing valves 51 and 57.

(b) *Quasi-adiabatic desorption*

This step is initiated after the termination of step (a) by opening valve 26 only, and working gas is pumped out, by means of pump 27, from refrigeration chamber 18, via tube 20, heat exchanger 14, tube 21, and valve 26. During this step, no exchange gas flows through either of the pneumatic circuits of exchange gases No. 1 and No. 2. Chamber 18 and with it adsorbent 19 are thus isolated thermally, so that they cool down due to the desorption effect. This step is continued until the temperature of chamber 18 has dropped slightly below that at which it is desired to hold heat station or load 31.

(c) *Quasi-isothermal desorption*

This step is initiated after step (b) and, in it, all of the operations of step (b) are maintained except that, in addition, a flow of gas is maintained in the pneumatic circuit of exchange gas No. 2. This is effected by opening valve 58 to permit exchange gas No. 2 (such as helium) to flow through valve 58, tube 59, heat exchanger 60 (in which it acquires the temperature of heat sink 13), through tube 61, heat exchanger 62 in which it acquires the temperature of refrigeration chamber 18, via heat exchanger 62, thence through tube 63, to heat exchanger 64, whereby it maintains refrigeration at the heat station or load 31, and from which it discharges through line 65, and finally through valve 66. This step is terminated by closing valve 26 leading to the pump, thus halting the desorption of working gas, and by stopping the flow of exchange gas No. 2 by closing valves 58 and 66.

(d) *Quasi-adiabatic adsorption*

Initiation of this step takes place by opening valve 25 so as to permit working gas to enter the system. During this step, no exchange gas flows either in circuit No. 1 or No. 2, so that the refrigeration chamber 18 is thermally isolated. Working gas is fed through valve 25, and it passes through line 21, through heat exchanger 14 (in which is acquires the temperature of heat sink 13), thence through tube 20 and into chamber 18, wherein it becomes adsorbed onto adsorbent 19. This adsorption releases heat sufficient to warm up chamber 18 and its contents. The process is permitted to continue until the temperature of chamber 18 is approximately equal to that of heat sink 13. Now, the system is back to its initial condition, and a complete cycle has been performed for repetition again with step (a), etc.

The aforesaid four steps constitute the operation of this invention as embodied in a single stage cyclic desorption refrigeration system. The considerations discussed previously with respect to the embodiment of FIG. 1 are also applicable here, and will not be repeated. It may be noted, however that the embodiment of FIG. 4 also is capable of being operated as a dual or triple combination of single stage systems, or in cascade with these or other systems, or as combinations of both. Moreover, the same general features and advantages of the invention in the embodiment of FIG. 1 are also included in the embodiment of FIG. 4.

A further embodiment of the present invention is depicted in FIG. 5, which is a further development of that illustrated in FIG. 4, with similar performance being accomplished, except that use is made of only one exchange gas stream to carry out the functions of the two exchange gas streams shown in FIG. 4. This is achieved by use of two valves in the gas stream at low temperatures, whereby the gas stream may be canalized into two different paths. The operation of the FIG. 5 system follows the same cyclic four steps previously described for FIG. 4, with the following differences:

(a) *Quasi-isothermal adsorption*

The only difference in this step between the systems of FIG. 4 and FIG. 5 is that in FIG. 5 the exchange gas stream after leaving heat exchanger 55, passes through line 67, then through valve 68 in line 69, and discharges out of valve 70. During this step, valve 71 is closed.

(b) *Quasi-adiabatic desorption*

Here, as in the system of FIG. 4, no exchange gas flows and, moreover, valves 68 and 71 are kept closed during the step.

(c) *Quasi-isothermal desorption*

In this case, the difference between the systems of FIG. 4 and FIG. 5 is that in FIG. 5 the exchange gas flow, which is maintained during this step, is fed through valve 58, then passed through line 59, and heat exchanger 60 (in which it acquires the temperature of heat sink 13), thence through line 61, heat exchanger 55 (in which it acquires the temperature of chamber 18), thence through tube 67 and through valve 71, line 72 and heat exchanger 64 (at which it maintains refrigeration at heat station or load 31), and then discharges out of tube 65 and through valve 66. During this step valve 68 is closed.

To those skilled in the art, many variations, other than the specific embodiments herein described, are possible within the broad scope of the present disclosure, such as the physical and geometric arrangement of the adsorbent, the means by which good thermal contact may be made between it and the thermal conduits leading to and from it, and the like, and it is to be understood that such variations do not alter the general scope and operation of the invention as herein claimed.

I claim:

1. A method of removing heat from an object to be refrigerated which comprises cyclically:
    (a) supplying a gas to a thermally isolatable chamber containing an adsorbent for the gas while maintaining heat transfer between the chamber and a heat sink;
    (b) pumping adsorbed gas out of said chamber while maintaining the chamber in substantial thermal isolation until the temperature within the chamber is substantially below the temperature of the heat sink;
    (c) continuing to pump adsorbed gas out of said chamber while maintaining heat transfer between the chamber and the object to be refrigerated;
    (d) supplying the gas to said chamber while maintaining the chamber in substantial thermal isolation until the temperature in the chamber is approximately that of the heat sink.

2. A method as defined in claim 1 wherein the gas passes in heat transfer relation to the heat sink during all of the steps of the cycle.

3. A method as defined in claim 1 wherein heat transfer between the thermally isolated chamber and the heat sink is effected by heat conduction.

4. A method as defined in claim 1 wherein heat transfer between the thermally isolatable chamber and the object to be refrigerated is effected by heat conduction.

5. A method as defined in claim 1 wherein heat transfer between the thermally isolated chamber and the heat sink is effected by heat convection.

6. A method as defined in claim 1 wherein heat transfer between the thermally isolatable chamber and the object to be refrigerated is effected by heat convection.

7. A refrigerator for the removal of heat at low temperature from an object by the cyclic description of a gas from an adsorbent therefor comprising:
    a primary heat sink;
    a chamber containing an adsorbent for the gas;
    and a final refrigeration station;
    interruptible heat transfer means connecting the primary heat sink and the adsorbent-containing chamber;
    interruptible heat transfer means connecting the adsorbent-containing chamber and the final refrigeration station;
    and means for cyclically supplying a gas to and pumping the gas out of said adsorbent-containing chamber.

8. A refrigerator as defined in claim 7 in which at least one of the interruptible heat transfer means is a thermal valve.

9. A refrigerator as defined in claim 7 in which at least one of the interruptible heat transfer means is a valved gas conduit.

10. A refrigerator as defined in claim 7 wherein the gas is helium.

11. A refrigerator as defined in claim 7 wherein the primary heat sink, the adsorbent-containing chamber and the final refrigeration station are contained in a common heat-insulating housing.

12. A refrigerator as defined in claim 7 wherein the gas passing to and from the adsorbent-containing chamber is in heat transfer relation to the primary heat sink.

13. A refrigerator as defined in claim 9 wherein said valved gas-conduit passes successively in heat transfer relation to the primary heat sink, the adsorbent-containing chamber and the primary heat sink.

14. A refrigerator as defined in claim 9 wherein said valved gas-conduit passes successively in heat transfer relation to the primary heat sink, the adsorbent-containing chamber, the final refrigeration station, the adsorbent-containing chamber and the primary heat sink.

References Cited

UNITED STATES PATENTS

| | | | |
|---|---|---|---|
| 3,188,824 | 6/1965 | Geist | 62—86 |
| 3,360,955 | 1/1968 | Witter | 62—332 X |

WILLIAM J. WYE, *Primary Examiner.*